(12) United States Patent
Kim et al.

(10) Patent No.: US 8,045,118 B2
(45) Date of Patent: Oct. 25, 2011

(54) LIQUID CRYSTAL DISPLAY

(75) Inventors: Hoon Kim, Ansan-si (KR); Jae-Jin Lyi, Yongin-si (KR); Hye-Ran You, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 329 days.

(21) Appl. No.: 12/194,058

(22) Filed: Aug. 19, 2008

(65) Prior Publication Data

US 2009/0096976 A1    Apr. 16, 2009

(30) Foreign Application Priority Data

Oct. 12, 2007  (KR) .......................... 10-2007-0103180

(51) Int. Cl.
*G02F 1/1343* (2006.01)
(52) U.S. Cl. ...................................... 349/143; 349/144
(58) Field of Classification Search .................... 349/144
See application file for complete search history.

(56) References Cited

U.S. PATENT DOCUMENTS

| 2008/0055292 A1* | 3/2008 | Do et al. ..................... 345/204 |
| 2009/0021658 A1* | 1/2009 | Takeuchi et al. ............. 349/37 |

\* cited by examiner

*Primary Examiner* — Uyen Chau N Le
*Assistant Examiner* — Chris Chu
(74) *Attorney, Agent, or Firm* — Innovation Counsel LLP

(57) ABSTRACT

In a liquid crystal display, an image-defining data voltage is simultaneously applied to a main pixel electrode (MPE) and an electrically isolatable sub pixel electrode (SPE) to thereby respectively define a main pixel voltage and a sub pixel voltage. The MPE defines one plate of a first capacitor whose other plate receives a first common voltage whose voltage level can be varied after the image-defining data voltage is applied. Thus the main pixel voltage is shifted up or shifted down according to the voltage variation of the first common voltage. The SPE defines one plate of a second capacitor whose other plate receives a second common voltage. By causing the main pixel voltage to be of greater absolute amplitude than the sub pixel voltage, a side visibility of the liquid crystal display can be enhanced. Also, the liquid crystal display utilizes a liquid crystal having a dielectric anisotropy and an elastic constant ratio within a specific range, so that an undesirable increase of a black brightness effect is reduced and thus image contrast is not adversely affected.

7 Claims, 7 Drawing Sheets

LIQUID CRYSTAL DISPLAY

CROSS-REFERENCE TO RELATED APPLICATION

This application relies for priority upon Korean Patent Application No. 2007-103180 filed on Oct. 12, 2007, the disclosure of which is herein incorporated by reference in its entirety.

BACKGROUND

1. Field of Invention

The present disclosure of invention relates to liquid crystal displays (LCD's). More particularly, the present disclosure relates to a liquid crystal display capable of achieving a wide viewing angle.

2. Description of Related Technology

In recent times, in order to improve over a narrow viewing angle of conventional liquid crystal display devices, various driving methods for the liquid crystal display device have been developed, including a patterned vertical alignment (PVA) mode, a multi-domain vertical alignment (MVA) mode, and a super-patterned vertical alignment (S-PVA) mode.

An LCD device using the S-PVA mode typically includes pixel areas each having two sub-pixels, and each of the two sub-pixels includes a main pixel electrode and a sub pixel electrode to which different voltages are applied in order to form liquid crystal domains having different grays from each other in the pixel area. Since human viewers watching the S-PVA mode LCD device perceive an phantom intermediate value of the two gray-scales being present between the main pixel electrode and the sub pixel electrode, the S-PVA mode LCD device helps to prevent or reduce deterioration of a side visibility aspect of the displayed image due to distortion of a gamma curve under an intermediate gray scale, thereby improving the side visibility of the S-PVA mode LCD device.

The S-PVA mode LCD devices may be classified into a coupling capacitor type (CC-type) and a two-transistor type (TT-type) according to the driving method thereof.

The CC-type S-PVA mode LCD device further includes a coupling capacitor inserted between the main pixel electrode and the sub pixel electrode. This coupling capacitor drops a voltage level of a main data voltage applied to the main pixel electrode to thereby apply the dropped data voltage to the sub pixel electrode as a sub pixel voltage having a lower voltage level than that of the main pixel voltage.

The TT-type S-PVA mode LCD device applies the main pixel voltage and the sub pixel voltage having different voltage levels to the main pixel electrode and the sub pixel electrode, respectively, using two separate thin film transistors.

In comparison with the TT-type S-PVA mode LCD device, the CC-type S-PVA mode LCD device has disadvantages, such as deterioration in brightness and relatively poor side visibility. On the other hand, the TT-type S-PVA mode LCD device has better brightness characteristics and side visibility than the conventional CC-type S-PVA mode LCD device. However, since two transistors are required in the TT-type S-PVA mode, its manufacturing cost increases substantially, and it is difficult to adopt the TT-type S-PVA mode to a high-speed driving method because the number of TFT's that must be individually controlled by separate gate control signals is double that present in a CC-type S-PVA mode LCD device.

Meanwhile, in case of a storage swing method in which a wide viewing angle is achieved by changing a voltage applied to a storage electrode that is overlapped with a pixel electrode, brightness and side visibility characteristics are superior, and a manufacturing cost is low. In the storage swing method, brightness and side visibility characteristics are improved as a voltage variation increases; however, transmittance in a black brightness range undesirably increases and thus causes a drastic decrease in a contrast ratio when the voltage variation of the storage electrode is increased.

SUMMARY

The present disclosure provides a liquid crystal display adopting a storage swing method that is capable of increasing brightness and side visibility and simultaneously preventing contrast ratio from decreasing excessively.

In an exemplary embodiment, a liquid crystal display includes an array substrate having a pixel electrodes structure and a thin film transistor (TFT) where the TFT switchingly transmits a supplied data voltage to electrodes of the pixel electrodes structure during a horizontal scan period (1H). The embodiment further includes an opposite substrate facing the array substrate, and a liquid crystal material layer interposed between the array substrate and the opposite substrate. The pixel electrodes structure includes a main storage electrode (MSE) receiving a first common voltage whose voltage level is varied (e.g., pulsed), a main pixel electrode (MPE) overlapped with the main storage electrode to define a first storage capacitor where the MPE receives the data voltage as a main pixel voltage when the TFT is switched into a conductive state, where the main pixel voltage is thereafter changed in accordance with a voltage variation of the first common voltage. The pixel electrodes structure includes a sub pixel electrode (SPE) that is spaced apart from the main storage electrode in a plan view of the display, where the SPE also receives the data voltage as a sub pixel voltage when the TFT is switched into a conductive state, but where the sub pixel voltage is not thereafter changed in accordance with the voltage variation of the first common voltage.

In one embodiment, the liquid crystal of the liquid crystal material layer has a dielectric anisotropy ($\Delta \in$) value in a range of about −3.8 to about −2.2.

Also, the liquid crystal has an elastic constant ratio (K33/K11) in a range of about 1.155 to about 1.385.

At least one of the dielectric anisotropy and the elastic constant ratio may be chosen within the above-described ranges.

In one exemplary embodiment, a ratio of an area of the main pixel electrode to an area of the sub pixel electrode is in a range of 1:1 to 1:1.2.

According to the above, since the liquid crystal display utilizes the liquid crystal having the dielectric anisotropy and/or the elastic constant ratio, a voltage variation range of the main storage electrode may be maximized while preventing an undesired increase of black brightness due to application of the first common voltage. Thus, the resulting liquid crystal display may exhibit increased brightness for thereby improving side visibility and at the same time a high contrast ratio may be maintained.

BRIEF DESCRIPTION OF THE DRAWINGS

The above and other advantages of the present disclosure will become readily apparent by reference to the following detailed description when considered in conjunction with the accompanying drawings wherein.

DETAILED DESCRIPTION

Figure 1:
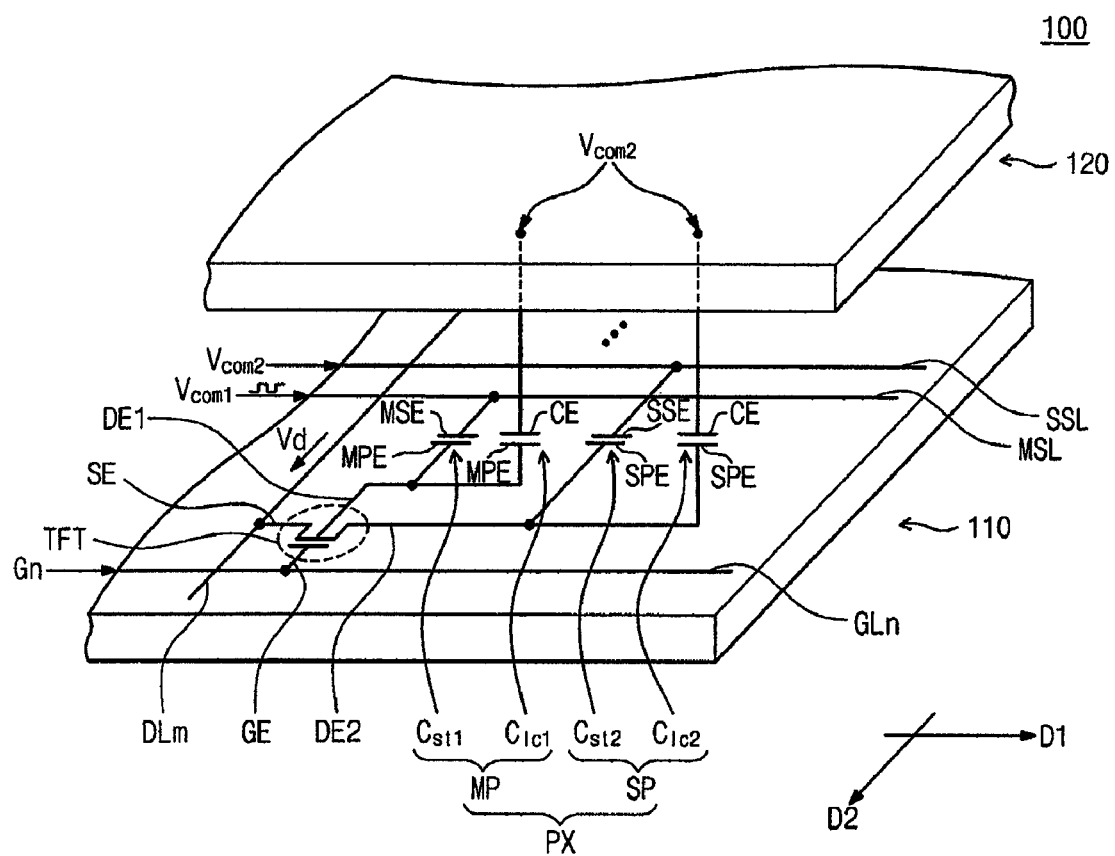
FIG. 1 is an exploded perspective view showing an exemplary embodiment of a liquid crystal display according to the present disclosure.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is an exploded perspective view showing an exemplary embodiment of a liquid crystal display according to the present disclosure.

Referring to FIG. 1, a liquid crystal display 100 includes a TFT array substrate 110, an opposite substrate 120 facing the array substrate 110, and a liquid crystal material layer (not shown in FIG. 1) interposed between the array substrate 110 and the opposite substrate 120.

The array substrate 110 includes a gate line GLn, a data line DLm, a main storage line MSL, a sub storage line SSL, a dual-drain thin film transistor TFT, and a pixel electrode structure PX.

The gate line GLn is extended in a first direction D1 and receives a gate pulse Gn. The gate pulse Gn includes a gate-on voltage that is maintained during a 1H horizontal scan period and a gate-off voltage that is maintained during a remaining vertical scan period except for the 1H period.

The data line DLm is extended in a second direction D2 that is substantially perpendicular to the first direction D1. The data line DLm is insulated from and intersected with the gate line GLn and receives a data voltage Vd.

The main storage line MSL is extended in substantially parallel with the gate line GLn and receives a first common voltage Vcom1 in an alternating current or pulsed form.

The sub storage line SSL is extended in substantially parallel with the main storage line MSL and receives a second common voltage Vcom2 in a direct current (DC) form.

The thin film transistor TFT is electrically connected to the gate line GLn and the data line DLm to apply the data voltage Vd to the pixel structure PX in response to the gate pulse Gn. As mentioned, the thin film transistor TFT is of a dual drain configuration and thus includes a first drain electrode DE1 and a second drain electrode DE2.

The pixel structure PX includes a main pixel sub-structure MP and a sub pixel sub-structure SP.

The main pixel sub-structure MP is connected to the first drain electrode DE1 of the thin film transistor TFT, and the sub pixel sub-structure SP is connected to the second drain electrode DE2 of the thin film transistor TFT.

The main pixel sub-structure MP includes a first storage capacitor Cst1 and a first liquid crystal capacitor Clc1. The first storage capacitor Cst1 is formed by a main storage electrode MSE, an insulating layer, and a main pixel electrode MPE. The main storage electrode MSE is formed as a portion of the main storage line MSL that is overlapped with the main pixel electrode MPE. Thus, the main storage electrode MSE receives the first common voltage Vcom1 in the alternating current form. The first liquid crystal capacitor Clc1 is formed by the main pixel electrode MPE, a liquid crystal layer, and a common electrode CE. The data voltage Vd is applied to the main pixel electrode MPE by the TFT during the 1H period, and at the same time the second common voltage Vcom2 in the direct current form is applied to the common electrode CE.

The sub pixel sub-structure SP includes a second storage capacitor Cst2 and a second liquid crystal capacitor Clc2. The second storage capacitor Cst2 is formed by a sub storage electrode SSE, the insulating layer, and a sub pixel electrode SPE. The sub storage electrode SSE is formed as a portion of the sub storage line SSL that is overlapped with the sub pixel electrode SPE. Accordingly, the sub storage electrode SSE receives the second common voltage Vcom2 in the direct current form. The second liquid crystal capacitor Clc2 is formed by the sub pixel electrode SPE, the liquid crystal layer, and the common electrode CE. The data voltage Vd is applied to the sub pixel electrode SPE during the 1H period, and the second common voltage Vcom2 in the direct current form is applied to the common electrode CE.

The opposite substrate 120 is coupled with the array substrate 10 while facing the array substrate 110. The opposite substrate 120 includes a transparent common electrode layer (not shown in FIG. 1) to receive the second common voltage Vcom2. The common electrodes CE that are respectively arranged at one ends of first and second liquid crystal capacitors Clc1 and Clc2 are formed by the portions of the common electrode layer overlapped with the main pixel electrode MPE and the sub pixel electrode SPE, respectively. Accordingly, the common electrode CE receives the second common voltage Vcom2.

The liquid crystal material layer is interposed between the array substrate 110 and the opposite substrate 120 to form the liquid crystal display 100 with the array substrate 110 and the opposite substrate 120.

In the present exemplary embodiment, the sub pixel SP includes the second storage capacitor Cst2, however, the second storage capacitor Cst2 may be optionally removed from the sub pixel SP. Also, in the described embodiment the second common voltage Vcom2 is applied to both the common electrode CE and the sub storage electrode SSE, however, two different voltages may be applied to the common electrode CE and the sub storage electrode SSE, respectively.

Hereinafter, the liquid crystal display 100 of FIG. 1 will be described further in detail with reference to FIGS. 2 and 3.

Figure 2:
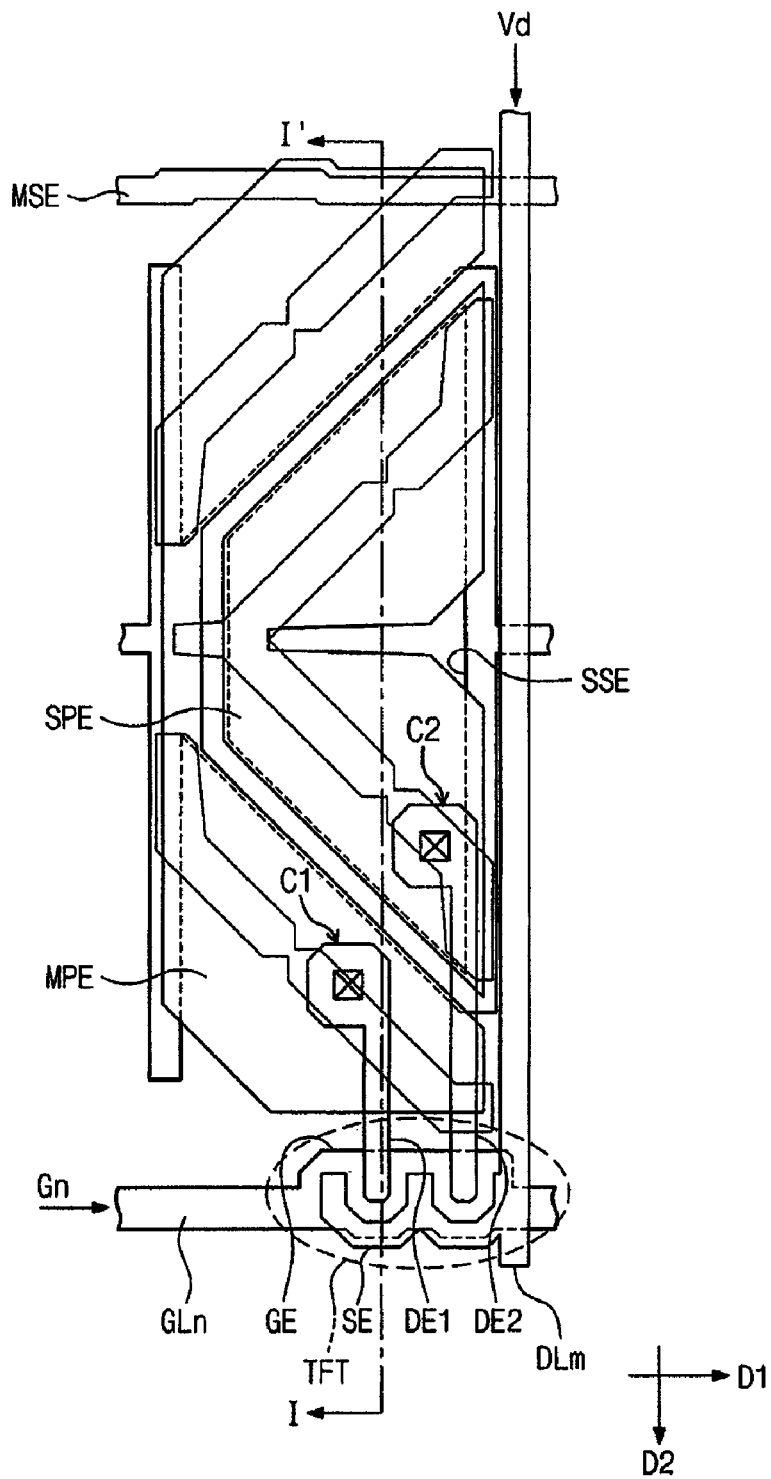
FIG. 2 is a layout diagram showing a liquid crystal display of FIG. 1.
Figure 3:
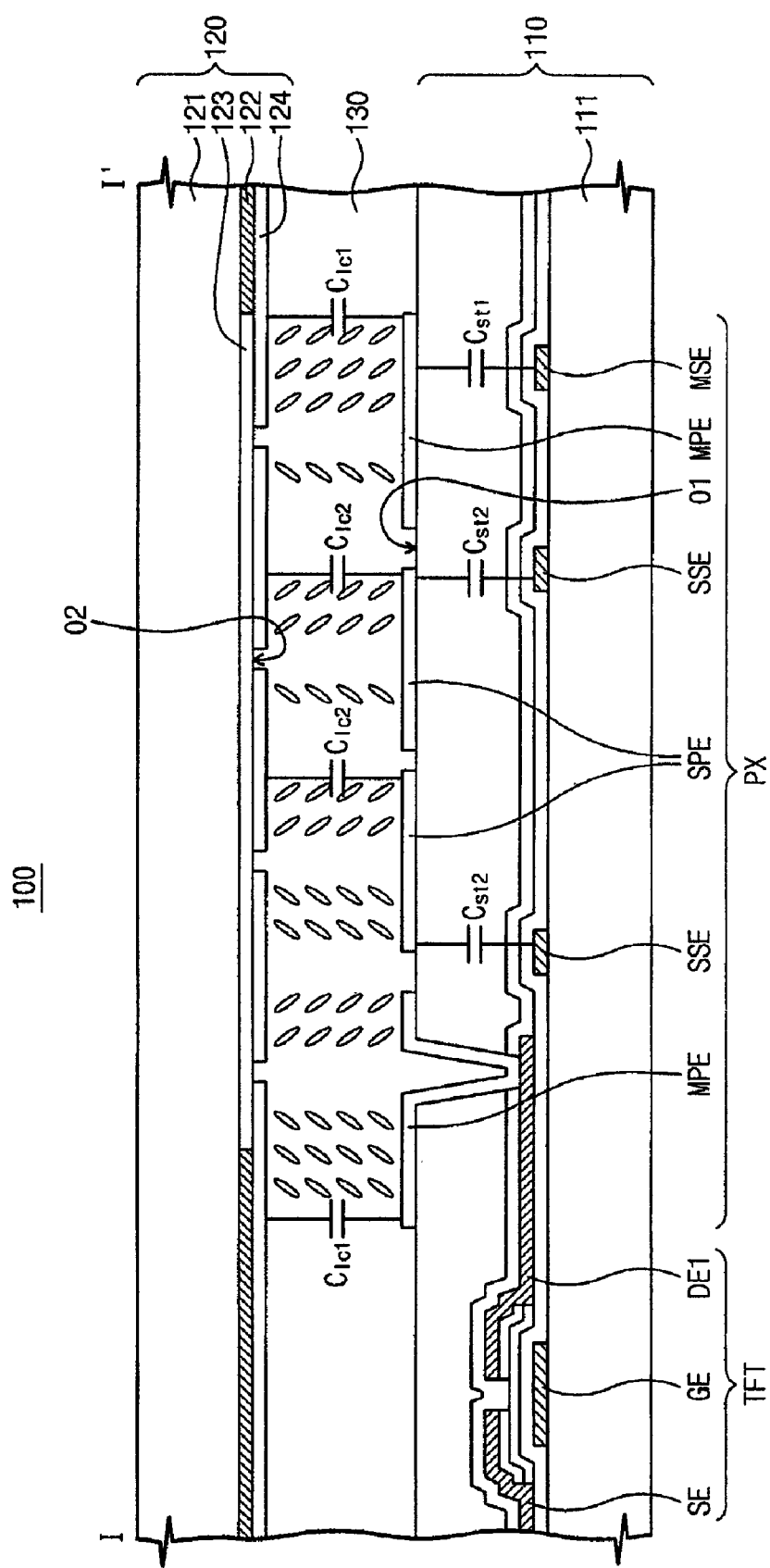
FIG. 3 is a sectional view taken along a line I-I' of FIG. 2.

FIG. 2 is a layout diagram showing the liquid crystal display of FIG. 1, and FIG. 3 is a sectional view taken along a line I-I' shown in FIG. 2. In FIG. 2, a black matrix shown in FIG. 3 will be omitted in order to simplify the layout diagram for better understanding.

Referring to FIGS. 2 and 3, the liquid crystal display 100 includes the array substrate 110, the opposite substrate 120, and the liquid crystal material layer 130 (shown in FIG. 3) interposed between the array substrate 110 and the opposite substrate 120.

The array substrate 110 includes a first base substrate 111 and the gate line GLn, the data line DLm, the thin film transistor TFT, and the pixel structure PX, which are arranged on the first base substrate 111.

The gate line GLn is extended in the first direction D1, and the data line DLm is extended in the second direction D2 that is substantially perpendicular to the first direction D1. The data line DLm is insulated from and intersected with the gate line GLn.

The thin film transistor TFT is electrically connected to the gate line GLn and the data line DLm. The thin film transistor TFT includes a gate electrode GE branched from the gate line GLn and a source electrode SE branched from the data line DLm. The first drain electrode DE1 of the thin film transistor TFT is electrically connected to the main pixel electrode MPE, and the second drain electrode DE2 of the thin film transistor TFT is electrically connected to the sub pixel electrode SPE. Note in FIG. 2 that the transistor channels coupling the TFT source region (SE) respectively to drain regions DE1 and DE2 are both controlled by a same gate voltage (applied on the GE electrode). Thus a single gate control signal applies to DE1 and DE2.

The thin film transistor TFT couples the data voltage, Vd applied to the data line DLm to the first and second drain electrodes DE1 and DE2 in response to the gate pulse Gn applied through the gate line GLn being in the Von state (switching the transistor channels into respective conductive modes). Accordingly, the main pixel electrode MPE and the sub pixel electrode SPE are coupled to the source data voltage Vd through the thin film transistor TFT when the latter is turned on.

As shown in FIG. 1, a main pixel structure MP is provided and includes the main pixel electrode MPE and the main storage electrode MSE for forming a first storage capacitor Cs11. As shown in FIG. 1, a sub pixel structure SP is provided and includes the sub pixel electrode SPE and the sub storage electrode SSE for forming a second storage capacitor Cs12.

In FIG. 2, the main pixel electrode MPE is seen to be electrically connected to the first drain electrode DE1 of the thin film transistor TFT through a first contact hole C1 to thereby be switchingly coupled to receive the data voltage Vd. The sub pixel electrode SPE is seen to be electrically connected to the second drain electrode DE2 of the thin film transistor TFT through a second contact hole C2 to thereby be switchingly coupled to receive the data voltage Vd.

The main pixel electrode MPE is spaced apart from the sub pixel electrode SPE by a predetermined distance. When both channels in the TFT are rendered conductive (turned on), the main pixel electrode MPE is effectively electrically connected to the sub pixel electrode SPE through the turned-on thin film transistor TFT during the 1H period during which the turn-on gate pulse Von is applied via gate Gn. However, when the thin film transistor TFT is later turned off after the 1H period, the main pixel electrode MPE is electrically separated from the sub pixel electrode SPE. In the present exemplary embodiment, an area between the main pixel electrode MPE and the sub pixel electrode SPE is defined as a first separation opening O1 shown in FIG. 3, and the first opening O1 is formed during mass production by selectively removing (e.g., etching) part of an originally unitary pixel electrode layer (in the PX structure).

The main storage electrode MSE is extended in the first direction D1 and overlapped with the main pixel electrode MPE.

The first common voltage Vcom1 having different polarities with respect to a reference voltage Vr (shown in FIG. 4) is applied to the main storage electrode MSE. The polarity of the first common voltage Vcom1 applied to the main storage electrode MSE is periodically inverted.

The sub storage electrode SSE is arranged between the main storage electrode MSE and the gate electrode GE and overlapped with the sub pixel electrode SPE. The second common voltage Vcom2 having a voltage level substantially equal to the reference voltage Vr (shown in FIG. 4) is applied to the sub storage electrode SSE.

The opposite substrate 120 includes a black matrix 122, a color filter layer 123, and a common electrode layer 124. The black matrix 122 includes a light blocking material and is arranged in an ineffective area of a pixel in order to prevent a light leakage between adjacent pixel areas. The color filter layer 123 includes red, green, and blue color filters and is arranged in an effective area of the corresponding pixel. The common electrode layer 124 is formed over the black matrix 122 and the color filter layer 123 to receive the second common voltage Vcom2 in the direct current form. In the present exemplary embodiment, the color filter layer 123 is arranged in the opposite substrate 120, however, the color filter layer 123 may be arranged in the array substrate 110.

Figure 4:
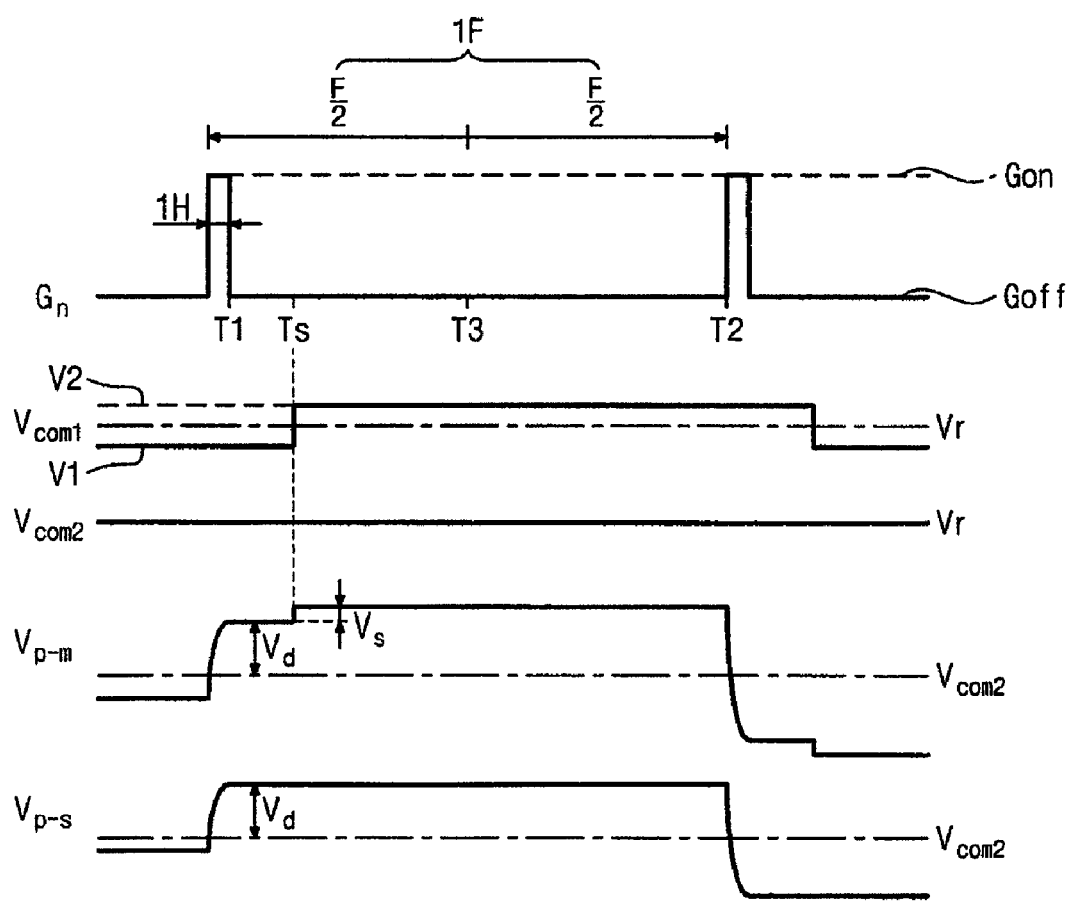
FIG. 4 is a waveforms diagram for an equivalent circuit of FIG. 1.

FIG. 4 is a waveforms diagram of signals applied to the pixel structure PX shown in FIGS. 1 to 3.

Referring to FIG. 4, when the thin film transistor TFT is turned on in response to the gate pulse Gon during the 1H period, the data voltage Vd applied to the source electrode SE is coupled to the first and second drain electrodes DE1 and DE2.

After the 1H period, the thin film transistor TFT is turned off, and the first and second drain electrodes DE1 and DE2 are then effectively electrically separated from each other.

The first common voltage Vcom1 in the alternating current form is applied to the main storage electrode MSE. The data voltage Vd is applied to the main pixel electrode MPE during the 1H period. The second common voltage Vcom2 in the direct current form is applied to the common electrode CE.

The first common voltage Vcom1 is the alternating current voltage that swings between a predetermined second voltage V2 that is higher than the reference voltage Vr and a predetermined first voltage V1 that is lower than the reference voltage Vr. A period of the first common voltage Vcom1 waveform corresponds to two frames. The second common voltage Vcom2 is uniformly maintained at the voltage level of the reference voltage Vr.

The first common voltage Vcom1 is affected by a generation timing of the gate pulse Gn and a polarity of the data voltage Vd. The voltage level of the first common voltage Vcom1 is shifted from the lower first voltage V1 to the higher second voltage V2 when a predetermined time elapses after the gate turn on pulse, Gon is generated.

The shift timing Ts of the first common voltage Vcom1 is within a range from a first timing point T1 at which the gate pulse Gn is lowered from the gate-on voltage Gon to the gate-off voltage Goff to a second timing point T2 at which one frame span elapses after having started at the first timing point T1. In the present exemplary embodiment, the shift timing Ts is within a range from the first timing T1 to a third timing T3 at which a half frame elapses from the first timing T1.

Meanwhile, the voltage level of the first common voltage Vcom1 is shifted up or shifted down according to the polarity of the data voltage Vd. Particularly, when the data voltage Vd has a positive polarity with respect to the second common voltage Vcom2, the first common voltage Vcom1 is shifted up from the first voltage V1 to the second voltage V2. On the contrary, when the data voltage Vd has a negative polarity with respect to the second common voltage Vcom2, the first common voltage Vcom1 is shifted down from the second voltage V2 to the first voltage V1.

When the gate-on pulse Gon is generated during the 1H period, the data voltage Vd is charged onto the first liquid crystal capacitor Clc1 (of the MP structure) and the second liquid crystal capacitor Clc2 (of the SP structure) as a main pixel voltage Vp-m and a sub pixel voltage Vp-s, respectively. Assuming that the data voltage Vd has the positive polarity, the first common voltage Vcom1 is shifted up at the shift timing Ts and Vp-m shifts up by the amount Vs as shown in FIG. 4. In other words, since the voltage level of the first common voltage Vcom1 applied to the main storage electrode MSE increases at time point Ts, the main pixel voltage Vp-m developed on the first liquid crystal capacitor Clc1 increases by a corresponding shift voltage Vs.

Thus, after the shift timing Ts, the main pixel voltage Vp-m charged to the first liquid crystal capacitor Clc1 has a voltage level that is higher than that of the sub pixel voltage Vp-s charged to the second liquid crystal capacitor Clc2.

Although not shown in the figures, it is to be understood that a reverse polarity operation takes place when Vd is in a negative polarity mode. Assuming that the data voltage Vd has the negative polarity, the first common voltage Vcom1 will be instead shifted down at the shift timing Ts. Accordingly, when the voltage level of the first common voltage Vcom1 applied to the main storage electrode MSE decreases, the main pixel voltage Vp-m charged to the first liquid crystal capacitor Clc decreases by the shift voltage Vs.

Thus, after the shift timing Ts, the main pixel voltage Vp-m charged to the first liquid crystal capacitor Clc1 has a voltage level that is lower than that of the sub pixel voltage Vp-s charged to the second liquid crystal capacitor Clc2.

As described above, the liquid crystal display 100 applies the first common voltage Vcom1 in the alternating current form (or digitally pulsed voltage form) to the main storage electrode MSE of the first storage capacitor Cst1 that is arranged in the main pixel MP, so that the main pixel voltage Vp-m charged to the first liquid crystal capacitor Clc1 and the sub pixel voltage Vp-s charged to the second liquid crystal capacitor Clc2 will develop different voltage levels from each other between time points Ts and T2.

As a result, when a given data voltage Vd is applied, liquid crystal molecules included in the liquid crystal material layer 130 corresponding to the main pixel MP and liquid crystal molecules included in the liquid crystal material layer 130 corresponding to the sub pixel SP will have different alignment directions from each other. Accordingly, the main pixel MP and the sub pixel SP will display different gray-scale images. In general, a user perceives an image that is obtained by mixing the two adjacent images that are respectively displayed in the regions of the main pixel MP and the sub pixel SP. Therefore, a side visibility of the liquid crystal display 100 may be improved by this mixing phenomenon.

Figure 5:
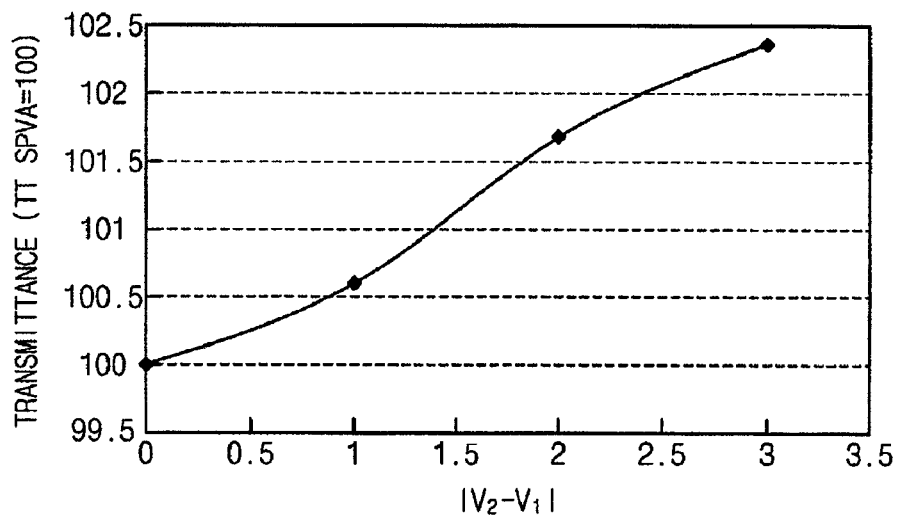
FIG. 5 is a graph showing a computer simulation result of a transmittance characteristic of a liquid crystal display according to the present disclosure with respect to a voltage variation amount of a first common voltage.

Meanwhile, a transmittance characteristic of the liquid crystal display 100 is determined according to a variation amount of the first common voltage Vcom1. Referring to FIG. 5, in the liquid crystal display 100, light transmittance increases as the variation amount (absolute magnitude) of the first common voltage Vcom1 pulses increases. In FIG. 5, the x-axis represents the variation amount of the first common voltage Vcom1, that is, an absolute value (|V2−V1|) of difference between the second voltage V2 and the first voltage V1 shown in FIG. 4. The y-axis represents a transmittance amount where the value of 100 of the y-axis represents a transmittance of a conventional TT-type liquid crystal display of similar scale.

As shown in FIG. 5, the liquid crystal display 100 according to the present exemplary embodiment has an improved brightness compared to the conventional TT-type liquid crystal display. Thus a white brightness characteristic may be improved when the variation amount of the first common voltage Vcom1 increases. However, a black intensity may be deteriorated since a voltage level of a black voltage corresponding to a black brightness increases with increasing of the pulse amplitude of the first common voltage Vcom1.

Thus, in the present exemplary embodiment, a structure that is capable of preventing deterioration of the black brightness caused by the variation amount of the first common voltage Vcom1 is suggested. In order to prevent deterioration of the black brightness, it is proposed to increase a threshold voltage of the liquid crystal. Accordingly, in the present exemplary embodiment, a liquid crystal that has a dielectric anisotropy $\Delta \in$ and an elastic constant ratio K33/K11 each having a specified value as suggested below should be employed for the liquid crystal display 100 in order to reduce deterioration of the black intensity aspects of the displayed images. The $\Delta\in$ is a difference value between $\in\parallel$ (parallel) and $\in\perp$, where the $\in\parallel$ symbol represents a dielectric constant in a long axis direction of the liquid crystal and $\in\perp$ represents a dielectric constant in a short axis direction of the liquid crystal. Also, the K33/K11 is obtained by dividing K33 by K11, and K33 represents a bend elastic constant of the liquid crystal and K11 represents a splay elastic constant of the liquid crystal.

Figure 6:
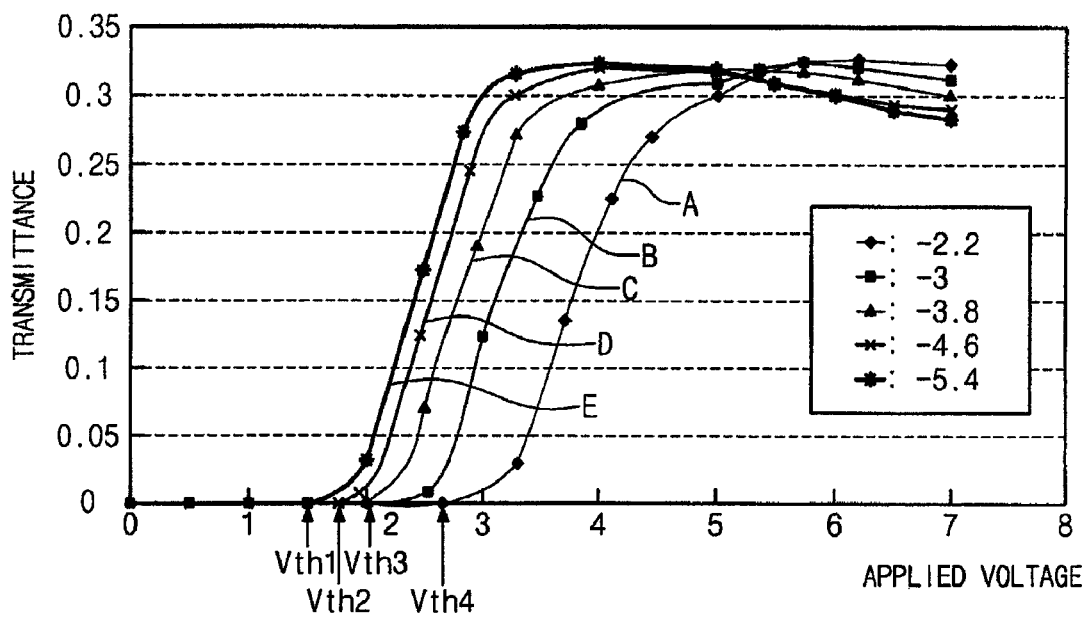
FIG. 6 is a graph showing a relation between a pixel voltage and a transmittance according to a dielectric anisotropy of a liquid crystal.

FIG. 6 is a graph showing a relation between a pixel voltage and a transmittance according to a dielectric anisotropy of a liquid crystal.

Referring to FIG. 6, graphs A, B, C, D, and E are corresponding to dielectric anisotropies $\Delta\in$ of −2.2, −3, −3.8, −4.6, and −5.4, respectively. As seen in FIG. 6, a threshold voltage level of increasing value appears and gradually increases in the sequential plots from the plot of embodiment E to the plot of embodiment A. Accordingly, liquid crystals corresponding to the graphs A to C have higher threshold voltages than those of the liquid crystals corresponding to the graphs D and E (i.e., Vth1<Vth2<Vth3<Vth4). The result indicates that the threshold voltage of liquid crystal becomes higher as the absolute value of the dielectric anisotropy $\Delta\in$ decreases.

Also, the transmittance slowly increases in a transmittance period representing a black brightness as the absolute value of the dielectric anisotropy $\Delta\in$ decreases. In general, a liquid crystal adopted in a vertical alignment type liquid crystal display has a dielectric anisotropy $\Delta\in$ of about −3.8 and is corresponding to the graph C. Thus, an increase of the black brightness caused by the voltage variation of the main storage voltage may be prevented or reduced when a liquid crystal having a higher dielectric anisotropy $\Delta\in$ than −3.8 (in other words, a relatively lower absolute value) is employed for the liquid crystal display 100. Therefore, the dielectric anisotropy $\Delta\in$ is in the range of $-3.8<\Delta\in<-2.2$, and preferably, $-3.2<\Delta\in<-2.2$ is suggested for development as a low-anisotropy liquid crystal in order to improve black intensity.

Figure 7:
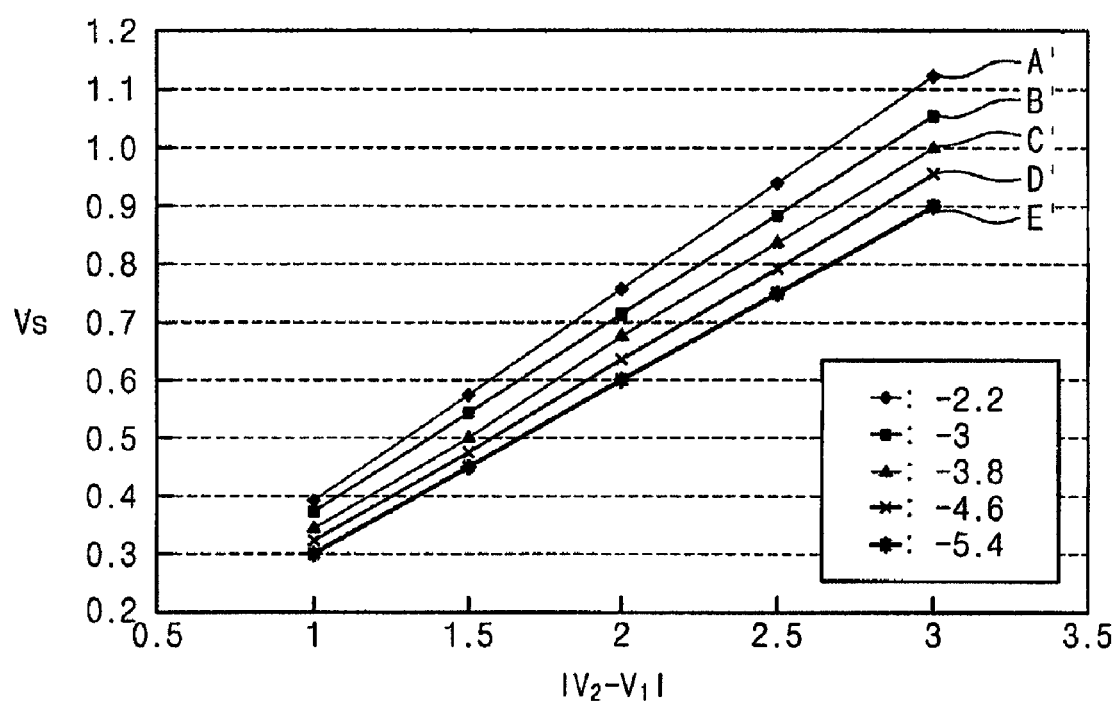
FIG. 7 is a graph showing a simulation result of a relation between a variation amount of a first common voltage and a shift voltage according to a dielectric anisotropy.

FIG. 7 is a graph showing a simulation result of a relation between a variation amount of the first common voltage and a shift voltage according to a dielectric anisotropy.

In FIG. 7, each of the graphs A', B', C', D', and E' has a same dielectric anisotropy $\Delta\in$ as that of the graphs A, B, C, D, and E of FIG. 6. Also, in FIG. 7, the x-axis represents a variation amount |V2−V1| of the first common voltage Vcom1, and the y-axis represents the shift voltage Vs shown in FIG. 4.

Referring to FIG. 7, a variation amount of the shift voltage Vs gradually varies from the graph E' to the graph A'. That is, the variation amount of the shift voltage Vs increases from the graph E' to the graph A' at a point where the variation amount of the first common voltage Vcom1 is about 1.5V. Accordingly, a variation amount of the main pixel voltage Vp-m of the first liquid crystal capacitor Clc1 increases as the absolute value of the dielectric anisotropy $\Delta\in$ decreases, as a result, the transmittance and the side visibility of the liquid crystal display 100 are improved. Referring to again FIG. 6, when a liquid crystal of which the dielectric anisotropy $\Delta\in$ has a low absolute value is applied to the liquid crystal display 100, a black brightness problem may be prevented from increasing due to the increase of the threshold voltage of the liquid crystal, however, a transmittance corresponding to a same gray-scale voltage may decrease. However, as shown in FIG. 7, the shift voltage Vs increases as the absolute value of the dielectric anisotropy $\Delta\in$ decreases, thereby preventing decrease of the transmittance as above-described.

As a result, the liquid crystal display 100 according to the present disclosure may adopt the liquid crystal having the dielectric anisotropy within a range of about −2.2 to about −3.8 (preferably, $-2.7>\Delta\in>-3.6$), so that the deterioration of the black brightness may be prevented (or reduced) and the transmittance and the side visibility may be simultaneously improved.

Figure 8:
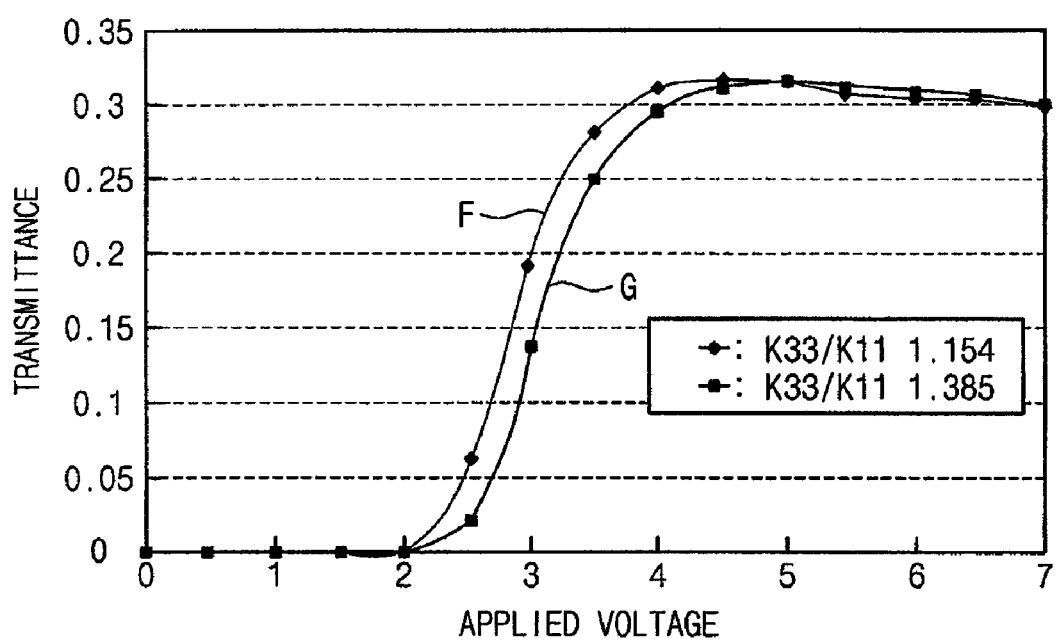
FIG. 8 is a graph showing a relation between a transmittance and a gray-scale voltage according to an elastic constant ratio of a liquid crystal.

FIG. 8 is a graph showing a relation between a transmittance and a gray-scale voltage according to a varied elastic constant ratio of a liquid crystal.

In FIG. 8, plot F corresponds to an elastic constant ratio (K33/K11=1.154) of a first liquid crystal, and a plot G corresponds to an elastic constant ratio (K33/K11=1.385) of a more preferred second liquid crystal.

As seen in FIG. 8, in the range where the transmittance is lower than about 0.05 (that is, a transmittance range in which the problematic black brightness can appear), the preferred embodiment of plot G has a smaller slope than that of the embodiment of plot F. In other words, for roughly equal small variations in applied voltage, the responsive variation in transmittance in the range below a transmittance of 0.05 is relatively small for the preferred embodiment of plot G and larger for the embodiment of plot F. From this it can be deduced that slope decreases as the elastic constant ratio (K33/K11) increases. Thus by adjusting the elastic constant ratio (K33/K11) one can obtain a desired responsiveness (within available limits) to voltage change in the problematic black brightness range (e.g., where transmittance is less than about 0.05).

Accordingly, when a liquid crystal display employs a liquid crystal having an elastic constant ratio (K33/K11) that is equal to or larger than 1.154, the variation range of the transmittance in the darker or blacker range decreases in comparison with a more conventional liquid crystal and as a result, the undesired increase of black brightness may be prevented or reduced even though the black voltage corresponding to the black brightness increases by the shift voltage Vs. However, when the elastic constant ratio (K33/K11) excessively increases, the gray-scale voltage also increases in order to obtain the same transmittance. Therefore, in one class of exemplary embodiments in accordance with the disclosure, it is desirable to use a liquid crystal having an elastic constant ratio K33/K11 in a range of about 1.155 to about 1.385, and more preferably 1.154<(K33/K11)<1.5 as the utilized range.

Also, it is believed that the transmittance may be maximized while preventing the undesired increase of the black brightness by appropriately adjusting values of both the dielectric anisotropy $\Delta\in$ and the elastic constant ratio K33/K11.

Since it is difficult to produce a single liquid crystal material with arbitrarily selected ones of the above-described properties, a liquid crystals mixture may be formed by mixing various ones of among 10 to 20 different kinds of liquid crystals. Various computer programs may be used to predict characteristics of the mixed liquid crystals prior to verification with actual experiments.

In the computer simulation runs that produced the values shown in FIGS. 5 to 8, simulation results were taken under a condition in which a ratio of an area of the main pixel electrode MPE to an area of the sub pixel electrode SPE is 1:1.1. It may be desirable however to choose other area ratios between the main pixel electrode MPE to the sub pixel electrode SPE within a range of about 1:1 to about 1:1.2.

According to the above disclosure, when a liquid crystal display utilizes one or more liquid crystals exhibiting the dielectric anisotropy and the elastic constant ratios as described above, the voltage variation range of the main storage electrode may be maximized while preventing an undesired increase of transmittance in the black brightness range. Thus, such a liquid crystal display may exhibit increased brightness in the white brightness range and have the enhanced side visibility while not exhibiting substantially increased brightness in the black brightness range, thereby maintaining a high contrast ratio.

Although the exemplary embodiments have been described herein, it is understood that the disclosure is not intended to be limited to these exemplary embodiments and various changes and modifications can be made by one of ordinary skilled in the art in light of the above teachings and within the spirit and scope of the present disclosure.

What is claimed is:

1. A liquid crystal display comprising:
   an array substrate comprising a pixel electrodes structure and a thin film transistor (TFT) where the TFT is operable to selectively couple a supplied data voltage to electrodes of the pixel electrodes structure;
   an opposite substrate facing the array substrate; and
   a liquid crystal material layer interposed between the array substrate and the opposite substrate, wherein:
   the pixel electrodes structure comprises:
   a main storage electrode (MSE) receiving a first common voltage whose voltage level can be varied;
   a main pixel electrode (MPE) overlapped with the main storage electrode and coupled to the TFT so as to receive the data voltage as a main pixel voltage, where the main pixel voltage can thereafter be changed in accordance with the voltage variation of the first common voltage; and
   a sub pixel electrode (SPE) that is spaced apart from the main storage electrode and is coupled to the TFT so as to receive the data voltage as a sub pixel voltage, where the sub pixel voltage is not changed in accordance with the voltage variation of the first common voltage, and
   wherein the liquid crystal of the liquid crystal material layer has a dielectric anisotropy ($\Delta \in$) in a range of about $-3.8$ to about $-2.2$.

2. The liquid crystal display of claim 1, wherein the liquid crystal has the dielectric anisotropy ($\Delta \in$) in a range of about $-3.6$ to about $-2.7$.

3. The liquid crystal display of claim 2, wherein the liquid crystal has an elastic constant ratio (K33/K11) in a range of about 1.154 to about 1.5.

4. The liquid crystal display of claim 2, wherein the liquid crystal has an elastic constant ratio (K33/K11) in a range of about 1.155 to about 1.385.

5. The liquid crystal display of claim 1, wherein the liquid crystal has an elastic constant ratio (K33/K11) in a range of about 1.154 to about 1.5.

6. The liquid crystal display of claim 1, wherein the liquid crystal has an elastic constant ratio (K33/K11) in a range of about 1.155 to about 1.385.

7. The liquid crystal display of claim 1, wherein a ratio of an area of the main pixel electrode to an area of the sub pixel electrode is in a range of 1:1 to 1:1.2.

* * * * *